Dec. 30, 1969         G. HEIDRICH         3,486,394
SPUR GEAR WITH HERRINGBONE TOOTHING
Filed May 20, 1968                    2 Sheets-Sheet 1

INVENTOR.
GUNTHER HEIDRICH
BY
Beaman & Beaman
Attys.

Dec. 30, 1969  G. HEIDRICH  3,486,394
SPUR GEAR WITH HERRINGBONE TOOTHING
Filed May 20, 1968  2 Sheets-Sheet 2

INVENTOR.
GUNTHER HEIDRICH
BY
Beaman Beaman
Attys

United States Patent Office 3,486,394
Patented Dec. 30, 1969

1

3,486,394
SPUR GEAR WITH HERRINGBONE TOOTHING
Gunther Heidrich, Munich, Germany, assignor to
Alexander Stoeckicht, Munich, Germany
Filed May 20, 1968, Ser. No. 730,217
Claims priority, application Germany, June 6, 1967,
St 26,977
Int. Cl. F16h 55/04, 57/00
U.S. Cl. 74—458          3 Claims

ABSTRACT OF THE DISCLOSURE

The spur gear comprises two helically toothed gear portions with helix angles smaller and greater than 45 degrees, respectively, the tangent of the greater helix angle being equal to the triple value of the tangent of the smaller helix angle. Both gear portions differ in width and have equal numbers of teeth. The height of the teeth of the gear portion with the greater helix angle decreases to both tooth end faces. The tooth ends of this gear portions are relieved. With teeth with the greater helix angle the breaking of tooth edges is avoided so that power transmission can be increased.

BACKGROUND OF THE INVENTION

Field of the invention

The invention relates to a spur gear with herringbone teeth wherein both tooth portions differ from each other essentially by different tooth widths and helix angles, the broader toothing portion having a helix angle of less than 45° and the narrower tooth portion having a helix angle of greater than 45°.

Description of the prior art

Herringbone teeth for spur gears is known wherein the difference between the two helix angles is selected to be such that the tangent of the greater helix angle is equal to at least twice the tangent of the smaller helix angle. Such herringbone teeth are characterized by their asymmetry and are used in the construction of gearings and have become known from the German Letters Patents 1,157,049 and 1,175,054. With the aid of herringbone teeth it is possible in a simple manner to provide a planetary gearing, for example, which is capable of adjusting itself effectively and quickly to a uniform load distribution with the aid of extremely simple means.

There is nothing published in the two above mentioned German Letters Patents about the dimensions of the teeth of such asymmetric herringbone gearing with respect to the bearing strength of the teeth especially with a tooth having a helix angle of greater than 45°. This results from the fact that when determining the dimensions of the tooth recourse had to be had to test results because none of the known methods of calculation to determine the tooth stress can be applied directly to a tooth with helical angles of greater than 45°.

If one calculates the stress of the root of a tooth for a gearing with a helix angle of 60° according to the various calculating methods, which are usual, one will arrive at results which considerably differ from each other to such an extent that one cannot say according to which method the stress may be determined at least approximately, for an helix angle of this size. Also for all the other types of stress, such as stress acting on the tooth flanks and galling stresses, it is not known how to arrive at the required tooth dimensions for tooth helices of greater than 45°. Presumably, this is to be attributed on the one hand to the great helix angle itself and the basically different stress relationships while, on the other

2 hand, it may be assumed that teeth with a large helix angle such as 60° are neither known nor tested up to now for the transmission of relatively high power.

The safest way to determine the bearing strength of asymmetric herringbone teeth, therefore, consists in carrying out strength tests on gears constructed in the above manner, in which tests these teeth then must be able to withstand high specific stresss in order to be suited also for high-power transmission. But these strength tests are extremely circumstantial and time-consuming.

When testing gearings with hardened asymmetric herringbone teeth with helix angles of 30° and 60°, respectively, it was found that with the narrow 60° teeth the tooth breaking limit had to be considered as a stress limit which, however, is lower than with the broad 30° teeth. Therefore with a gearing provided with such herringbone teeth, the known advantages were accompanied by the disadvantage that only a smaller power can be transmitted as compared with a gearing with symmetric herringbone teeth, if the tooth breaking strength and no other stress factors, as per example the elastic deflection and distortion of the pinion in the case of especially small pinion diameters, is the limiting factor for the power which can be transmitted.

It has ben found that it is possible to obtain the higher tooth breaking limit necessary for an increase in the power transmission of the tooth portion with the greater helix angle of, for instance, 60° if one succeeds in reducing to a sufficient extent the especially high tendency of tooth edge breakage on this tooth portion. For this purpose, it is necessary to know the cause for the increase of the danger of tooth edge breakage with an increasing helix angle, especially with angles greater than 45°.

Test evaluations have become known which deal with the influence of an increasing helix angle up to approximately 45° on the bearing strength of the teeth. Accordingly, it is especially the distribution of the load along the contact lines of the tooth flanks with the counter tooth flanks that is affected strongly by the helix angle. FIGS. 1–3 show axial sectional views of three gears differing from each other only by their helix angles $\beta$. Contact lines B are drawn in the axial sectional views which extend on the tooth flanks from the tip to the root of the tooth and with increasing helix angle extend increasingly steeper while increasing in numbers. In addition, the distribution of the load which occurs along these so-called B-lines is plotted each time only along one contact line. The distribution of the load is sinusoidal with the maximum disposed approximately in the center and the minimum in the region of the engaging ends. With increasing helix angle however, the non-uniformity of load distribution decreases strongly and, with an angle of 45°, is practically equal to zero. From this tendency it may be derived that with a helix angle of 45° or even 60°, for example, a relatively much greater load acts at the tooth tip of the respective gear. This load is especially dangerous to the tooth ends because, in contrast to the center of the teeth, there is no bearing effect available on both sides by adjacent tooth root cross sectional areas.

It is furthermore known that with an increasing helix angle, the effect of tooth defects becomes greater. This may lead to a non-uniform distribution of the load across the tooth width which may entail a displacement of the bearing areas of the tooth towards the end of the tooth thus still more increasing the danger of tooth edge breakage.

The following measures are known to relieve the tooth ends for the purpose of reducing the danger of tooth edge breakage.

(a) A lateral chamfering of the tooth front ends beginning approximately at the root of the tooth and extending at an angle to the gear front face up to approximately 45°, as will be seen in FIG. 4.

(b) A longitudinal correction of the profile (crowning) of the tooth flanks similar to the crowning shown in FIG. 5.

(c) An increased production quality of the tooth forming whereby tooth defects are reduced.

None of the three known measures brings about the relief at the tooth ends necessary with helix angles greater than 45° to a high extent. Even when employing all the known remedies, tooth corner breakages cannot be avoided with asymmetric herringbone toothings with helices of 30° and 60°. It is a further disadvantage that with teeth of such a construction the bearing tooth width $b_w$ is reduced according to FIG. 5 in the tooth portion with the larger helix angle, whereby the effective coverage of angle of advance $\epsilon_s$ is reduced. This angle of advance coverage (Sprungüberdeckung) results from the formula:

$$\epsilon_s = \frac{b_w \cdot \sin \beta}{m_n \cdot \pi}$$

wherein $m_n$ indicates the normal modulus. The greatest possible coverage of the angle of advance, is necessary with helix angles of more than 45° in regard to the overall degree of coverage $$\epsilon \text{ total} = \epsilon + \epsilon_s$$

because with all asymmetric tooth designed in this manner with helix angles of 60°, for example, the profile coverage $\epsilon$ is essentially smaller than 1. Besides, provision of a profile longitudinal correction (crowning) is very expensive with great helix angles due to the strong curved tooth flanks.

An increase in quality is likewise expensive. As tooth of high bearing strength and running quality already have to meet requirement of a maximum quality which can be barely met, it is doubtful whether a further increase will still be possible at all, especially, in that a practically unobtainable, extremely high tooth quality would be necessary in order to balance the increased unfavourable effect of tooth defects occurring in connection with great helix angles.

It is the object of the invention with asymmetric herringbone teeth of spur gears to improve the tooth shape of the tooth portion having a helix angle of greater than 45° in such a manner that in its capacity to withstand stresses it at least equal the other tooth portion with the helix angle of less than 45°.

SUMMARY OF THE INVENTION

The afore-mentioned problem is solved in accordance with the invention by the combination of the following features:

(a) The tooth height of the teeth having the greater helix angle, starting from its nominal height $h_z$—with the dimension of $h_z$ in the known manner corresponding approximately to 2.25-times the normal modulus—is continuously decreased to a height of approximately $h_z/2$ at the tooth ends, this bevel extending from both tooth ends over a length of approximately 33% of the overall tooth width towards the center of the tooth;

(b) The number of teeth of the toothing portion having the greater helix angle is equal to the number of teeth of the toothing portion with the smaller helix angle;

(c) The tangent of the greater helix angle is approximately equal to three times the tangent of the smaller helix angle in a manner known per se;

(d) The difference in the two teeth widths is given by the width of the teeth with the greater helix angle being about 40% of the toothing width with the smaller helix angle.

With the asymmetric herringbone teeth and the toothing portion with the greater helix angle constructed according to the invention, the lever arm bending with the forces engaging at the tooth tips is gradually strongly reduced due to the continuous reduction of the tooth height taking place along a relatively great length. Thereby, the stress acting on the root of the teeth is largely reduced towards the tooth ends thereby most safely avoiding an overstressing of the root at these end portions.

A breaking out of the edge of the tooth crest as usually occurs at tooth front sides with steep chamferings is no longer possible with the teeth of the invention with the continuous reduction of the tooth height, because in connection with a good crest clearing—the radius $r$ of the roundness corresponds approximately to the normal modulus $m_n$—there is no longer a marked edge of tooth crest at the transition area to the tooth front side.

Owing to the provision of equal tooth numbers on the two teeth portions with different helix angles, the normal modulus of the tooth having the greater helix angle, will become considerably smaller than the normal modulus of the other tooth having the smaller helix angle, in a manner known per se. This results from the following known relation:

$$m_n = m_s \cdot \cos \beta$$

wherein $m_n$ is equal to the normal modulus, $m_s$ is equal to the front modulus and $\beta$ is equal to the helix angle.

As with equal numbers of teeth in the two tooth portions, also the front moduli of both portions must be the same, the normal moduli are related to each other as the cosines of the helix angles. Consequently, taking as an example for the portions helix angles of 30° and 60°, consequently, the following difference will result in the normal moduli:

$$m_n\ 30/m_n 60 = \cos 30°/\cos 60° = 0.866/0.5$$
$$m_n\ 60 = 0.577 \cdot m_n\ 30$$

This reduction of the normal modulus leads to the intended enlargement of the coverage of the angle of advance which is calculated according to the following formula:

$$\epsilon_s = \frac{b \cdot \sin \beta}{m_n \cdot \pi}$$

In this calculation, $b$ is equal to the tooth width in the axial direction. This enlargement is necessary to teeth having great helix angles such as 60°, for example, because such teeth, if they are constructed with the usual angles of mesh and no long teeth, in any case, the degree of profile coverage $\epsilon$ will always be essentially smaller than 1 and therefore will be insufficient. Only a sufficiently great coverage of the angle of advance will guarantee a uniform transmission of motion by the teeth. It will be advantageous also for the determination of the suitable number of teeth for an exactly predetermined gear ratio to provide equal numbers of teeth in the two teeth portions because an equal gear ratio is, of course, necessary for both tooth portions.

In the case of planetary gearings, to the feature of equal gear ratios there is still added another feature, namely that the sum of the numbers of teeth of the inner and outer sun wheels in both tooth portions are divisible by the number of planetary gears.

The invention therefore also extends to a planetary gearing consisting of inner and outer sun spur gears and at least one planetary spur gear, each of said gears comprising a first helically toother gear portion with a first helix angle smaller than 45 degrees and a second helically toothed gear portion with a second helix angle greater than 45 degrees, the tangent of the second helix angle being substantially equal to the triple value of the tangent of said first helix angle and the width of said second gear portion being about 40 percent of the width of said first gear portion, the teeth of said first and second gear portion being provided with an equal number of teeth and forming together a herringbone pattern and the sum of the number of teeth of the inner and outer sun spur gears in said first and second gear portions being selected to be divisible by the number of the planetary spur gears, the tooth height $h_z$ of the teeth on said second gear portion corresponding to approximately 2.25 times the normal modules along a central third of the tooth width and being reduced from both ends of said central third along both external thirds of the tooth width to a height of about $h_z/2$ adjacent the gear end faces.

Owing to the fact that the tangent of the greater helix angle is approximately three-times that of the smaller helix angle, there results an especially favourable gradation of the helix angles in both teeth. The tooth forces resulting therefrom which are effective in the front plane are inversely proportional to the tangent of the pertaining helix angles; in this case that is a relation of 1:3. The teeth with the greater helix angle consequently has to transmit only one-third of the load of the other teeth which calls for a width for these teeth of likewise only approximately 33% of the tooth width with the smaller helix angle, in case the bearing strength of both teeth are approximately the same. In order to take into account also the relatively greater load which due to the more uniform distribution of the load along the B-lines occurs at the tooth tip with teeth of great helix angles, in particular in the region of the tooth width which is not modified by the reduction of the tooth height, the width of the teeth in accordance with the invention is dimensioned to be approximately 40% of the width of the teeth with the smaller helix angle.

Another advantage of the partitioning of the tooth width according to the invention consists in the increased enlargement of the degree of coverage of the angle of advance with the teeth having the greater helix angle, so that this tooth construction is distinguished for its extremely favourable degree of overall coverage of the angle of advance, in spite of the insufficient profile coverage. But herewith, also the loss in profile coverage which occurs due to the continuous shortening of the depth of tooth engagement in the region of the continuous reduction in tooth height, is compensated so that a detrimental effect on the uniform running motion of the teeth with the great helix angle is avoided.

Due to the reduction in the tooth height and the reduced length of all the contact lines resulting therefrom, the stress on the tooth flanks is increased. But this does not have any significance because due to the other features, such as small normal modulus, great helix angle difference and greater tooth width, there will be obtained in any case a considerably smaller tooth flank stress with the teeth of the greater helix angle as compared with the other teeth with the smaller helix angle.

The especially small normal modulus also reduces the galling stress and the wear by slipping of the tooth portion with the greater helix angle (both stresses increase with an increase in the helix angle). This reduction is great especially at the ends of the teeth because there the effective tooth height is considerably reduced by the continuous shortening in accordance with the invention.

Another advantage of the continuous tooth-height reduction resides in the much more gradual tooth engagement which leads to a reduction of the gear noise because the pulse of engagement is considerably attenuated thereby.

While the combination of the features in accordance with the invention brings about a maximum of advantages with respect to the bearing strength of asymmetric gearing, especially for teeth having a helix angle which is selected to be greater than 45°, the production of the continuous reduction in tooth height is inexpensive and does not cause any difficulties, and the addendum circle diameter in the case of the teeth with the greater helix angle is gradually reduced in the form of a straight line. The tooth formation and the measuring of the teeth with the larger helix angle is favourably simplified when the continuous reduction in tooth height is made only after the tooth measurement has been carried out with the finished teeth before chamferings.

Actually, extreme chamferings of teeth are known for straight toothings.

While one of these known chamferings in the form of a curved tooth of the so-called Tacke coupling increases the flexibility of the coupling, the noise conditions are considerably improved by gradual tooth engagement with the aid of arcuate tooth tips chamfered (conical) along the entire tooth width. It has never been intended or attempted with the aid of the known extreme chamferings to affect the tooth bending stress. Nor was an effective relief of the tooth ends by chamfering considered as suitable in connection with teeth having a small helix angle because with a small helix angle the overall degree of coverage is reduced by the further chamfering, and the chamfering thus would have a detrimental effect.

DESCRIPTION OF THE PREFERRED EMBODIMENT

Figure 1:
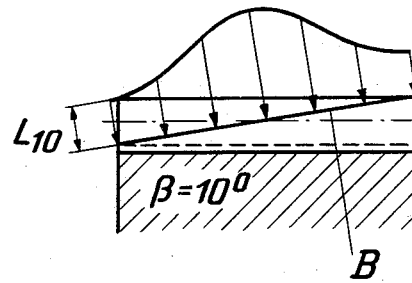
FIG. 1 shows an axial sectional view of a gear with a small helix angle with the load distribution plotted over the contact lines.
Figure 2:
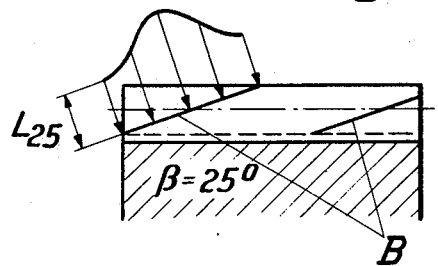
FIG. 2 shows a similar view as FIG. 1, however with a greater helix angle.
Figure 3:
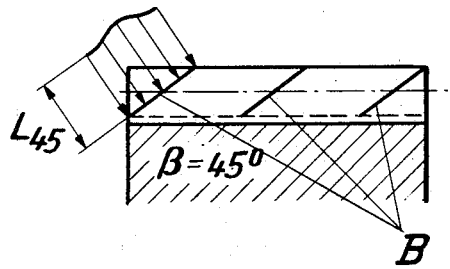
FIG. 3 shows a similar view as FIG. 1, however with a still greater helix angle than in FIG. 2.
Figure 4:
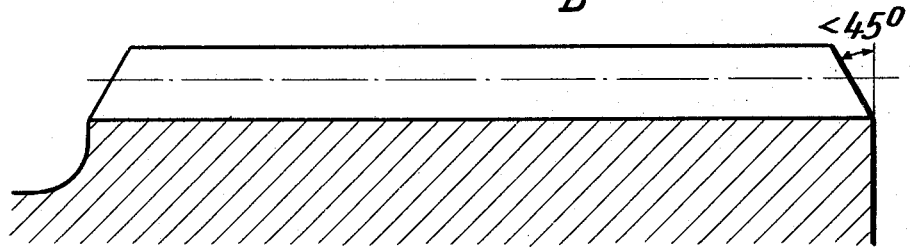
FIG. 4 shows the known lateral chamfering of the tooth front sides beginning at the dedendum and forming an angle with the gear front side plane up to approximately 45 degrees.
Figure 5:
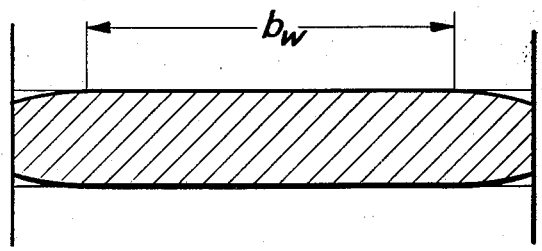
FIG. 5 shows the longitudinal correction of the profile (crowning) of the tooth flanks of a known spur gear.
Figure 6:
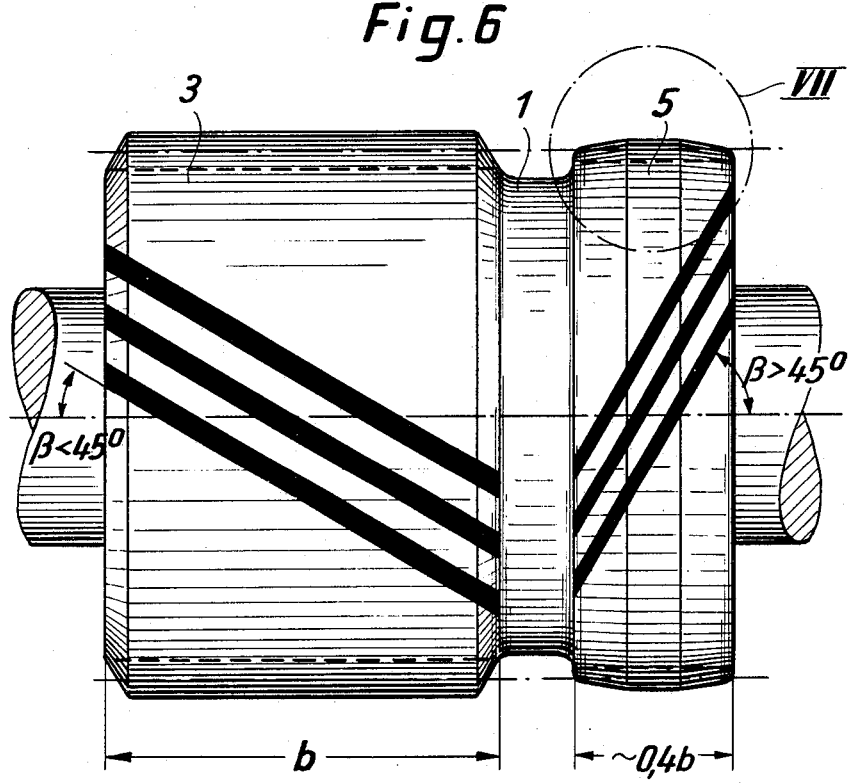
FIG. 6 shows a herringbone spur gear with two tooth formations having different helix angles in accordance with the invention.

FIG. 6 shows a spur gear 1 provided with double helical teeth (herringbone teeth). The left-hand teeth 3 in this embodiment show a greater tooth width than the right-hand teeth 5. The left-hand teeth 3 have the width $b$ and the width of the right-hand teeth 5 will approximately be $0.4b$. Furthermore, the tooth helix angle of the left-hand teeth is smaller than 45°, while the tooth helix angle of the right-hand teeth 5 is greater than 45°. The tangent value of the teeth 5 with the greater angle, in this embodiment, is about equal to three-times the value of the tangent of the teeth 3 with the smaller helix angle.

In addition, the number of teeth of the teeth 5 having the greater helix angle is equal to the number of teeth of the teeth 3 having the smaller helix angle.

Figure 7:
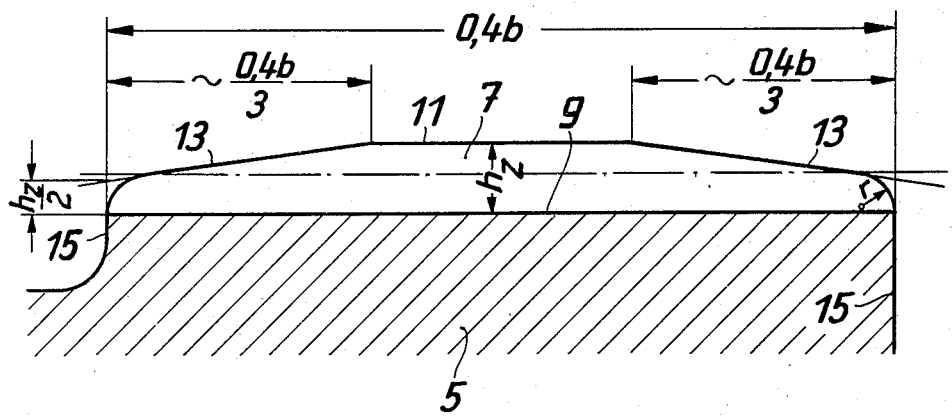
FIG. 7 shows the shape of a tooth of the tooth portion with the greater helix angle in accordance with the invention.

FIG. 7 shows the special shape of the teeth of the right-hand teeth with the greater helix angle. The individual teeth 7 of the right-hand teeth 5 have the height $h_z$ from the dedendum 9 to the addendum 11. The individual teeth are chamferred to their ends beginning at both ends of a center portion, the chamfering lines 13 extending straight-lined and being rounded at the tooth ends for transition into the surfaces of the front sides 15 of the gear. In the region of the transition from the chamfering lines 13 to the curvature radii $r$, the teeth have a height of approximately $h_z/2$. The length of the chamfering regions and the length of the tooth region with unreduced cross sectional area are still important. The chamfering lines extend from the gear front sides 15 of toothing 5 approximately up to $0.4\ b/3$ towards center of the tooth from both sides.

What is claimed is:

1. A spur gear comprising a first helically toothed gear portion with a first helix angle smaller than 45 degrees and a second helically toothed gear portion with a second helix angle greater than 45 degrees, the tangent of the second helix angle being substantially equal to three times the value of the tangent of said first helix angle and the width of said second gear portion being substantially 40 percent of the width of said first gear portion, the toothed portion of said first and second gear portion being provided with an equal number of teeth and forming together herringbone teeth, the tooth height of the teeth on said second gear portion corresponding along a central third of the tooth width to approximately 2.25 times the normal modulus and being reduced from both ends of said central third along both external thirds of the tooth width to a height of substantially one half the tooth height at said central third adjacent the gear end faces.

2. A spur gear according to claim 1, wherein the teeth of said second gear portion are bevelled along said external thirds in the form of a straight line.

3. A spur gear according to claim 1, wherein the transition areas between the addendum faces on said external thirds and the gear end faces are rounded off with a radius of curvature corresponding approximately to the normal modulus.

References Cited

UNITED STATES PATENTS

| | | | |
|---|---|---|---|
| 2,682,760 | 7/1954 | Shenk | 74—462 X |
| 2,982,146 | 2/1961 | Stoeckicht | 74—410 X |
| 3,011,365 | 12/1961 | Stoeckicht | 74—410 X |
| 3,184,988 | 5/1965 | Osplack et al. | 74—462 X |

LEONARD H. GERIN, Primary Examiner

U.S. Cl. X.R.

74—410